United States Patent [19]
Kurokawa

[11] Patent Number: 4,991,113
[45] Date of Patent: Feb. 5, 1991

[54] THERMAL TRANSFER PRINTER WITH IMAGE DATA PROCESSING

[75] Inventor: Hiroyuki Kurokawa, Tokyo, Japan

[73] Assignee: Seiko Instruments Inc., Japan

[21] Appl. No.: 332,807

[22] Filed: Apr. 3, 1989

[30] Foreign Application Priority Data

Apr. 5, 1988 [JP] Japan .................................. 63-83931

[51] Int. Cl.⁵ ............................................. C06K 15/00
[52] U.S. Cl. .................................... 364/519; 346/154
[58] Field of Search ....................... 364/518, 519, 523;
358/283, 298; 346/76 PH, 154

[56] References Cited

U.S. PATENT DOCUMENTS 4,843,408 6/1989 Tanaka ........................... 346/76 PH Primary Examiner—Arthur G. Evans
Attorney, Agent, or Firm—Bruce L. Adams; Van C. Wilks

[57] ABSTRACT

A printer of the thermal transfer type reproduces original gradated image comprised of individually gradated image elements into the form of printed gradated image having image density determined by number of printed image elements per unit section. A latch circuit latches successively an input train of gradated image bit data corresponding to the individually gradated image elements. A data processor successively converts the received input train of gradated image bit data into an output train of binary image bit data according to the image density of original image to be reproduced. A printing unit operates according to the output train of binary image bit data to selectively print the individual image elements so that the image density of printed image is represented in terms of number of printed image elements per unit section.

13 Claims, 2 Drawing Sheets

THERMAL TRANSFER PRINTER WITH IMAGE DATA PROCESSING

BACKGROUND OF THE INVENTION

The present invention relates to color printers of the thermal transfer type for printing a gradated image in the form of collective image elements according to image bit data, and more specifically relates to a data processor thereof for processing input image bit data to output image bit data for direct use in the printer.

Normally, individual image elements printed by a thermal transfer printer cannot be gradated individually due to its specific feature. Therefore, in order to print the gradated image, the image density is made in terms of a number of printed image elements per unit section. On the other hand, an original gradated image to be reproduced by the thermal transfer printer is normally comprised of collective image elements which are individually gradated. The collective image elements which are individually gradated are represented by a train of image bit data gradated correspondingly to the individually gradated image elements.

Accordingly, the original train of image bit data cannot be used directly in the thermal transfer printer. It is necessary to convert the original train of image bit data for use in the thermal transfer printer. Conventionally, such conversion is normally carried out externally of the printer. An image data source comprised of personal computer etc. and connected to the printer conventionally carries out such conversion before feeding the train of image bit data to the printer.

However, the personal computer requires a considerably long processing time to convert the image bit data, because the personal computer has to arithmetically process the image bit data bit by bit according to a given program or software. Thus, the conventional external data processing device is not practically matched to the high speed thermal transfer color printer.

SUMMARY OF THE INVENTION

An object of the present invention is to, therefore, provide an image bit data processor internally of the printer, effective to convert the input train of bit data indicative of image density in terms of individually gradated image elements into the output train of bit data indicative of image density in terms of a number of printed image elements per unit section. Another object of the present invention is to constitute the image bit data processor by several numbers of circuit components or hardware including counters and memory. A further object of the present invention is to carry out the conversion of image bit data by means of a conversion table stored in the memory.

BRIEF DESCRIPTION OF THE DRAWINGS

FIG. 3 is a diagram showing the arrangement of individual image elements of a printed image;

FIG. 4 is a conversion table stored in the memory of the image bit data processor according to the present invention;

FIG. 5 is a time chart for explaining the operation of the image bit data processor shown in FIG. 1; and FIG. 6 is a table showing the binary form of addressing signal applied to the memory of the inventive image bit data processor.

DETAILED DESCRIPTION OF PREFERRED EMBODIMENTS

Figure 1:
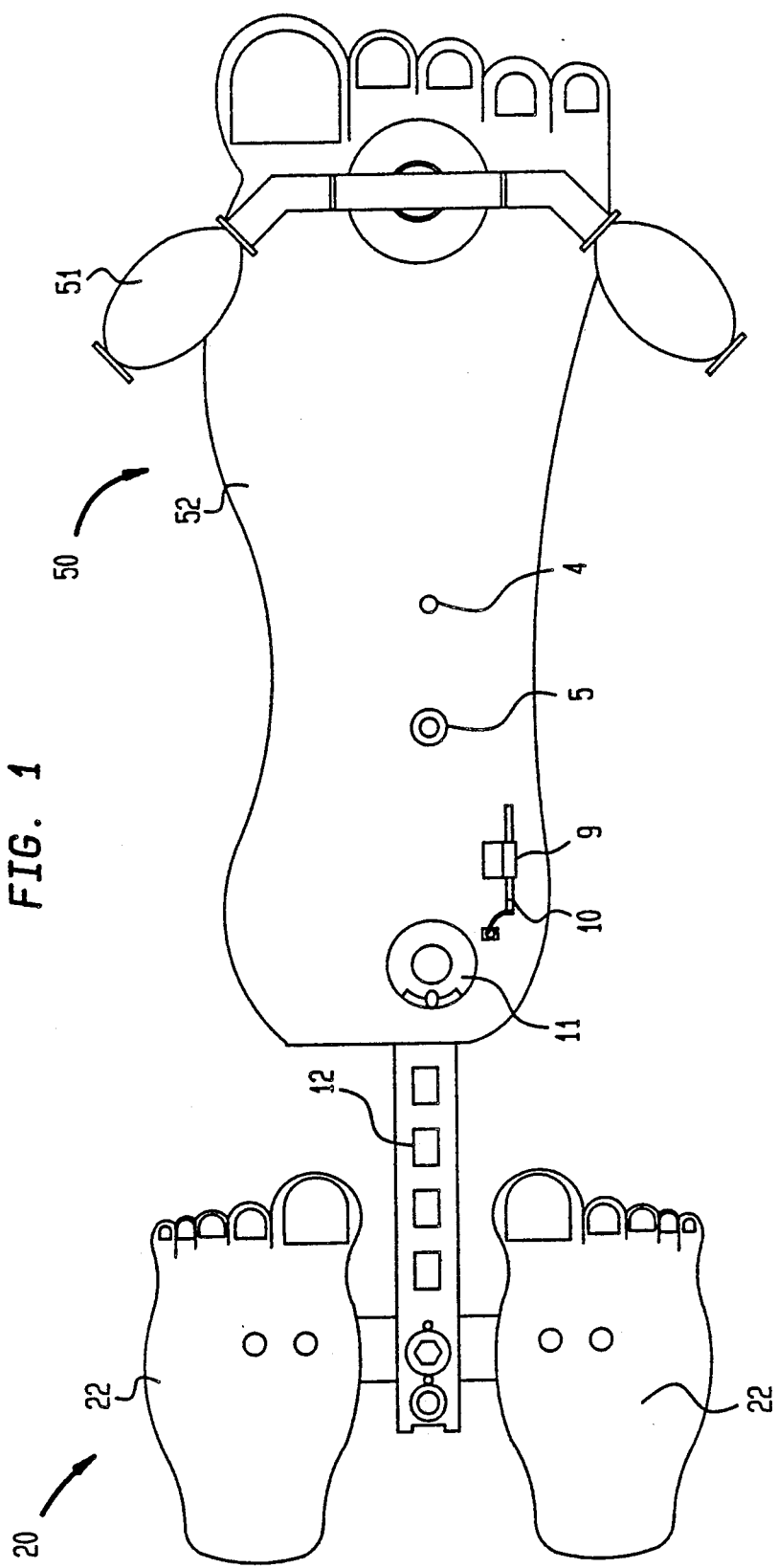
FIG. 1 is a circuit block diagram showing an image bit data processor provided in a color printer of the thermal transfer, type according to the present invention.

FIG. 1 shows the inventive image bit data processor provided in connection with a color printer of the thermal transfer type to convert a train of image bit data IN inputted from an external data source (not shown) and indicative of image density of an original image in terms of individually gradated image elements into a corresponding train of image bit data OUT outputted to a printing unit and indicative of image density of a printed image in terms of a number of printed image elements per unit section.

Figure 2:
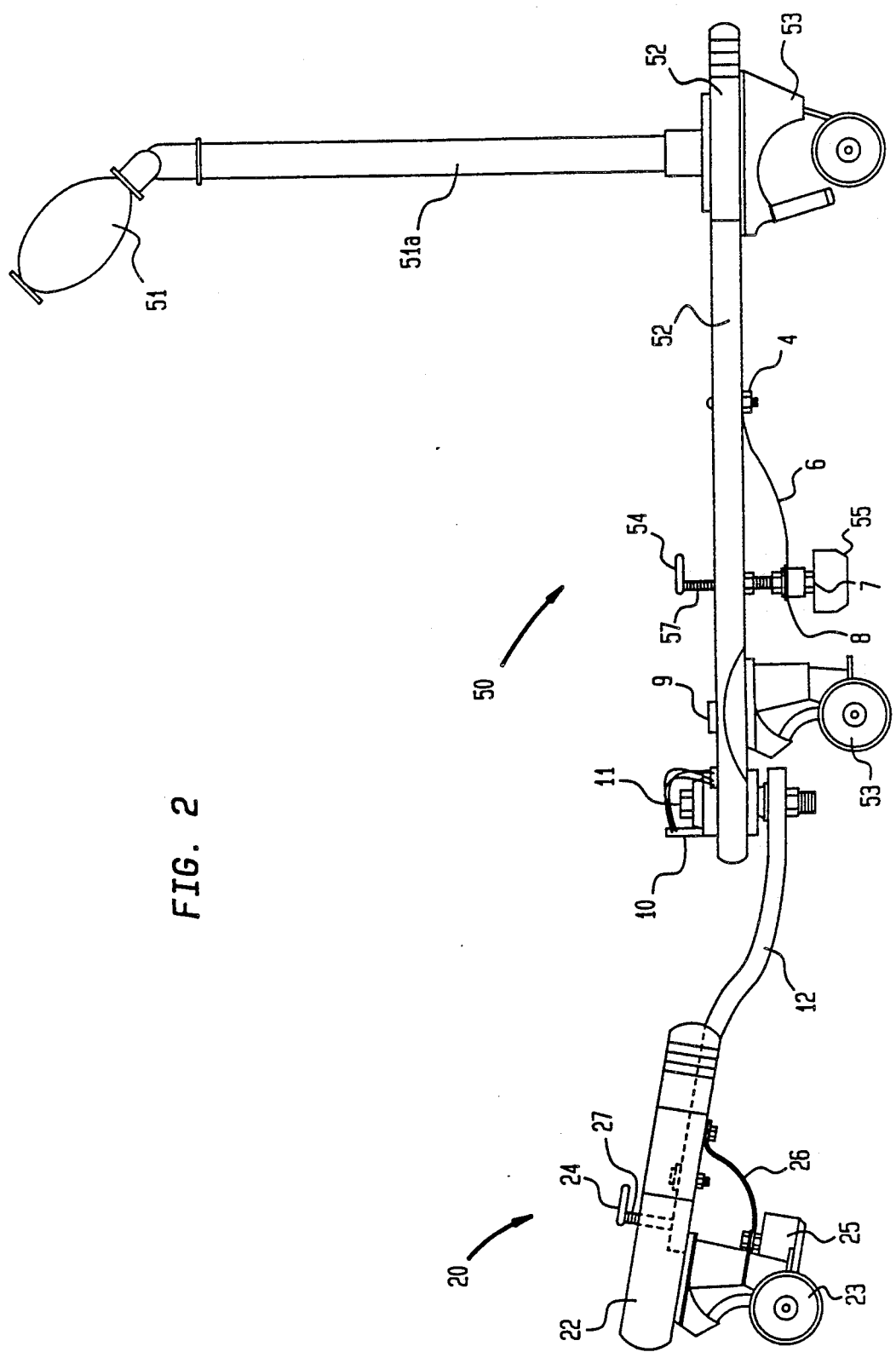
FIG. 2 is a diagram showing the arrangement of individual image elements of an original image to be printed.

FIG. 2 shows one example of the image element arrangement of the original gradated image elements 11–26 arranged in four rows and four columns. In this example, the individual image elements are gradated in four levels.

FIG. 3 shows the corresponding image element arrangement of the actually printed image comprised of sixteen individually binary-gradated image elements 27–42 in the form of printed and non-printed elements. As shown in FIG. 3, the thermal transfer printer cannot print multi-gradated individual image elements due to its specific feature. Accordingly, the image density of printed image is achieved in terms of number of printed image elements per unit section. In this example, each unit section is comprised of four adjacent image elements. The first section is comprised of four elements 27, 28, 31 and 32 and contains only one printed element 27, because the corresponding section of the original image shown in FIG. 2 is comprised of four elements 11, 12, 15 and 16 which have the lowest gradation level. The second section is comprised of four elements 29, 30, 33 and 34 and contains two printed elements 29 and 34, because the four corresponding elements 13, 14, 17 and 18 of the original image have the second gradation level. The third section is comprised of four elements 35, 36, 39 and 40 and contains three printed elements 35, 36 and 40, because the four corresponding elements 21, 22, 25 and 26 of the original image have the highest gradation level. As shown in FIG. 3, four elements contained in each unit section are printed in the order of upper left, lower right, upper right and lower left elements according to the gradation level of the corresponding unit section of the original image. Practically, the original image is comprised of millions of image elements, and four adjacent image elements within one unit section have the same gradation level almost everywhere throughout the original image. Therefore, the image density conversion from the original arrangement exemplified by FIG. 2 into the printed arrangement exemplified by FIG. 3 is actually practical and does not degrade the accuracy of image reproduction.

Referring back to FIG. 1, the, inventive image bit data processor is comprised of gradation signal generating means or a latching circuit 1 for sequentially latching the train of input image bit data IN in response to clock or strobe pulses CLK synchronized with the bit data IN, a column counter 2 for counting the clock pulses CLK sequentially to produce column position data CLM indicating whether an individual image element corresponding to the latched image bit data IN is located at an odd or even column of the image element matrix arrangement, an element counter 3 of a four bit counting type for counting successively the clock pulses CLK to output a timing pulse every four occurrence of the inputting of clock pulses CLK, and a row counter 4 responsive to the timing pulse from the element counter 3 for producing row position data ROW indicating whether an individual image element corresponding to the latched image bit data IN is located at odd or even row of the image element matrix arrangement. The column counter, element counter and row counter all comprising position signal generating means.

A memory 5 has a set of address terminals A0–A10. The address terminals A0–A7 receive latched image bit data IN sequentially from the latching circuit 1, the address terminal A8 receives the column position data CLM in synchronization with the outputting of latched image bit data IN, the address terminal A9 receives the row position data ROW in synchronization with the outputting of latched image bit data IN, and the last address terminal A10 receives additional control data CTL from selecting means (not shown). The memory 5 stores therein a conversion table addressable by data fed concurrently to the set of address terminals A0–A10 to sequentially output or read out a train of output image bit data OUT into a printing unit 6 of the thermal transfer type. Thus, the memory 5 operates to effect the conversion of the train of input image bit data IN representative of the original image into the train of output image bit data OUT representative of the printed or reproduced image.

Next, the operation of the inventive image bit data processor is explained with reference to FIGS. 4, 5 and 6. Referring to FIG. 5, the latching circuit 2 receives and latches the train of input image bit data IN in synchronization with the clock or strobe pulses CLK. The train of input image bit data IN is comprised of a plurality of bit data corresponding to a plurality of image elements 11–26 of the original image shown in FIG. 2. Each input bit data has a gradation value indicative of the gradation level of the corresponding image element. For example, the first bit data of input train IN has a gradation value of 40h represented in hexadecimal numeration system ("h" indicates the hexadecimal numeration system), and indicative of the lowest or first gradation level of the corresponding image element 11. The third bit data has a gradation value of 70h indicative of the second gradation level of the corresponding image element 13. In similar manner, the ninth bit data has a gradation value of A0h indicative of the third gradation level of the corresponding image element 19. The eleventh bit data has a gradation value of D0h indicative of the fourth or highest gradation level of the corresponding image element 21.

The column counter 2 counts the clock pulses CLK to produce the column position data CLM successively. As shown in FIG. 5, the column position data CLM is set to a low level value in response to the first clock pulse CLK so as to indicate that the corresponding image element 11 is positioned at a an odd column, i.e., positioned at left side of the unit section. On the other hand, the column position data CLM is switched to a high level value in response to the second clock pulse CLK so as to indicate that the corresponding image element 12 is positioned at an even column, i.e., positioned at a right side of unit section. Thereafter, the column position data CLM is switched alternately in response to each clock pulse CLK between the low and high level values, to thereby indicate whether an individual image element corresponding to the latched input image bit data is positioned at the left or right side of the unit section.

The element counter 3 counts the number of clock pulses CLK and produces a timing pulse every four occurrences of clock pulses CLK which correspond to a number of image elements arranged in one row as shown in FIG. 2. The row counter 4 receives the timing pulse and produces the row position data ROW. As shown in FIG. 5, the row position data ROW is switched between low and high level values in response to each successive timing pulse. For the first to fourth input image bit data, the row position data ROW is held at the low level value so as to indicate that the corresponding image elements 11–14 are arranged on an odd row, i.e., arranged at upper side of respective unit sections. For the following fifth to eighth input image bit data, the row position data ROW is switched to the high level value so as to indicate that the following corresponding image elements 15 to 18 are arranged on an even row, i.e., positioned at the lower side of respective unit sections. Accordingly, the row position data ROW is switched between the low and high logic level values every four clock pulses to indicate whether an individual image element corresponding to the currently latched input image bit data IN is positioned at upper or lower side of the unit section.

The memory 5 is provided with the set of address terminals A0–A10 where the terminal A0 is of the lowest order and the terminal A10 is of the highest order. The set of address terminals receive successively the latched image bit data IN, corresponding column position data CLM and corresponding row position data ROW concurrently to each other. The address terminals A0–A7 receive the image bit data IN in the form of binary numeration system representation, the address terminal A8 receives the column position data CLM in the form of binary representation, and the address terminal A9 receives the row position data ROW in the form of binary representation.

Referring to FIG. 6, when processing the first image element 11, the terminals A7–A0 are set with the value 40h of the first input bit data IN in the binary representation (01000000), and the terminals A9 and A8 are set with the values of row and column position data ROW and CLM, respectively, in the binary representation (00) which indicates that the first element 11 is positioned at upper left side of unit section. The combined binary representation (0001000000) at the terminals A9–A0 is changed to the corresponding hexadecimal representation 040h to be used as address data. In similar manner, when processing the second image element 12, the terminals A7–A0 are set with the value 40h in the binary form (01000000), and the terminals A9 and A8 are set with values of data ROW and CLM in the binary form of (01) which indicates that the element 12 is positioned at upper right side of unit section. The combined binary representation (0101000000) at the terminals A9–A0 is changed to the equivalent hexadecimal representation 140h. When processing the third element 13, the corresponding combined binary data (0001110000) inputted into the memory 5 is changed to the equivalent hexadecimal address data 070h. When processing the fifth element 15, the corresponding combined binary data (1001000000) is changed to the equivalent hexadecimal address data 240h in the memory 5. In similar and sequential manner, when processing the sixth element 16, the corresponding combined binary data (1101000000) is changed to the equivalent hexadecimal address data 340h.

Referring to FIG. 4, the memory 5 is stored with a conversion table which is comprised of an address portion and a content portion. The address portion is divided into eight sections comprised of 000h-02Fh, 030h-0FFh, 100h-18Fh, 190h-1FFh, 200h-2BFh, 200h-2FFh, 300h-35FH and 360h-3FFh. The content portion is set with the binary data 0 or 1 according to the address sections. The conversion table of memory 5 is operable to output selectively the binary data 0 and 1 according to the hexadecimal address data inputted at its address terminals A0-A9 to thereby produce a train of output image bit data OUT. For example, when converting the first input image element 11 into the corresponding first output image element 27, the corresponding address data 040h falls within the address section 030h-0FFh so that the memory 5 outputs the output image bit data OUT 1 according to the conversion table, effective to enable the printing unit 6 to print the image element 27. When converting the second input image element 12 into the corresponding second output image element 28, the corresponding address data 140h falls within the address section 100h-18Fh so that the memory 5 outputs the output image bit data OUT 0 effective to prevent the printing unit 6 from printing the image element 28. As shown in FIG. 5, the memory 5 is operated to sequentially produce the train of output image bit data OUT in the binary form effective to control the printing unit 6e to selectively print the output image elements 27-42 to thereby reproduce the original gradated image as shown in FIG. 3.

As explained above, according to the present invention, since the input image bit data corresponding to the gradated image elements of original image and the position data of the image elements are utilized as address data of the conversion table of memory effective to produce the converted output image bit data. The inventive image bit data processor does not require arithmetic processing time but requires only access time of the conversion table to thereby greatly improve the processing speed of image bit data as compared to the conventional CPU processor. Further, the inventive data processor can be formed with several circuit components such as counters and memory to thereby simplify its circuit structure.

In addition, when changing the arrangement of printed elements with the unit section of printed image, a control signal CTL is applied to the address terminal A10 such that the addressing of conversion table can be started from the address 440h. The unit section is comprised of four image elements in this embodiment; however, the unit section can be composed of various combination of adjacent several elements. The memory can be stored with different kinds of conversion tables according to the gradation levels of orginal image to be reproduced. The inventive data processor can be applied not only to the conversion image density, but also to the conversion of color code by changing the data arrangement in the memory. The throughput of the inventive processor is substantially determined according to the data transfer capacity.

What is claimed is:

1. A printer of the thermal transfer type for reproducing an original gradated image comprised of individually gradated image elements into the form of a printed gradated image having an image density determined by the number of printed image elements per unit section, the printer comprising: receiving means for receiving successively an input train of gradated image bit data corresponding to the individually gradated image elements; converting means for successively converting the received input train of gradated image bit data into an output train of binary image bit data according to the image density of the original image to be reproduced, said converting means including memory means for storing a plurality of conversion tables each having a different content to be referenced with when the input train of gradated image bit data is converted into an output train of binary image bit data, and selecting means for selecting one of said plurality of conversion tables; and printing means operative according to the output train of the binary image bit data to selectively print the individual image elements so that the image density of the printed image is represented in terms of the number of printed image elements per unit section.

2. A printer according to claim 1; wherein the receiving means includes latching means for successively latching the input train of gradated image bit data corresponding to the individually gradated image elements in synchronization with clock pulses, and counting means for counting the clock pulses and for producing position data indicative of the position of said corresponding image elements within the respective unit section.

3. A printer according to claim 2; wherein the conversion tables are addressable by the combination of latched image bit data and position data, and are readable to output the output train of binary image bit data according to the addressing by the latched image bit data and position data.

4. A thermal transfer type printer for reproducing an original gradated image having a first gradation format defined by original image elements into the form of a printed gradated image having a second gradation format different from the first gradation format, the printer comprising:
gradation signal generating means receptive of original image gradation information from the original image elements for generating gradation signals representative of the first gradation format defined by the original image elements;
position signal generating means receptive of original image positional information from the original image elements for generating position signals representative of the positions of the original image elements which define the first gradation format;
converting means receptive of the gradation and position signals for converting the same into print image signals representative of a printed gradated image in the second gradation format, the converting means comprising memory means for storing print image gradation data according to different image gradation formats one of which is the second format, selecting means for selecting one of the image gradation formats, and output means for outputting the print image gradation data of the selected image gradation format as the print image signals; and
printing means receptive of the print image signals for printing a printed gradated image according to the selected second gradation format.

5. A printer according to claim 4; wherein the gradation signal generating means comprises means for generating gradation signals representative of the first gradation format defined by individually gradated original image elements.

6. A printer according to claim 4; wherein the gradation signal generating means includes latching means for latching the original image gradation information.

7. A printer according to claim 4; wherein the position signal generating means comprises column signal generating means for generating column signals and row signal generating means for generating row signals, the row and column signals being representative of the row and column positions of the original image elements.

8. A printer according to claim 7; wherein the column signal generating means includes at least one column counter for counting clock pulses and for outputting the column signals, the clock pulses being contained in the original image positional information and representing the column positions of the original image elements.

9. A printer according to claim 7; wherein the row signal generating means comprises at least one element counter for counting clock pulses and for outputting timing pulses, the clock pulses being contained in the original image positional information, and at least one row counter for counting the timing pulses and for outputting the row signals, the timing pulses representing the row positions of the original image elements.

10. A printer according to claim 4; wherein the converting means includes means for converting the gradation and position signals into the print image signals having an image density, the image density being determined by a number of print image elements per unit of a section.

11. A printer according to claim 4; wherein the memory means includes conversion tables for storing the print image gradation data.

12. A printer according to claim 4; wherein the selecting means includes means for production control signals for selecting one of the image gradation formats.

13. A printer according to claim 4; wherein the memory means further includes print image color data stored according to a color code format.

* * * * *